Figure 2:
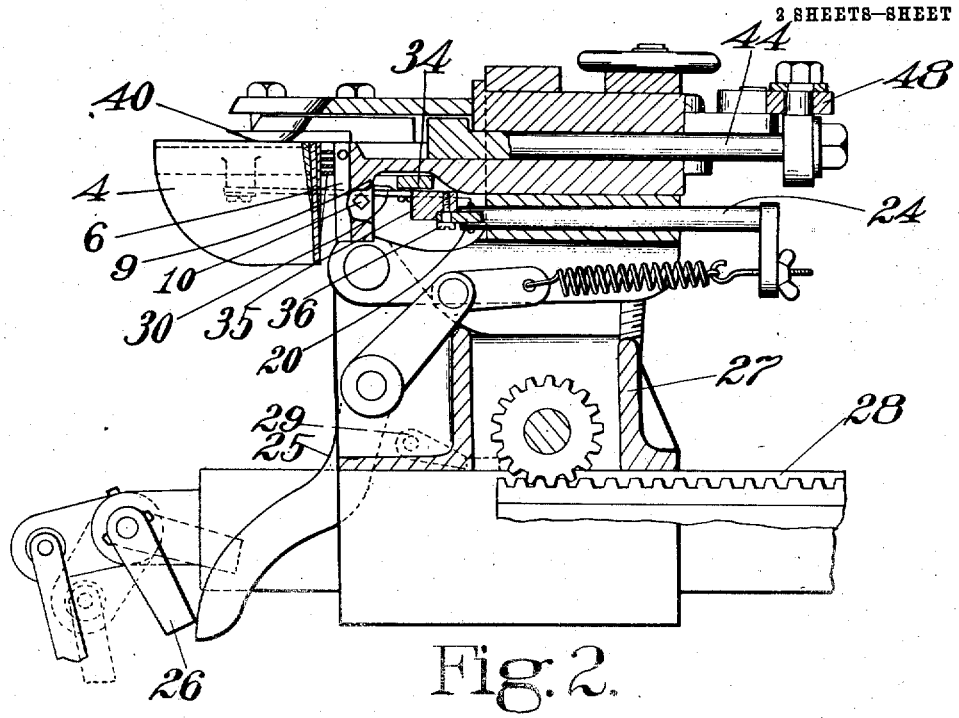

S. SNOW.

LASTING MACHINE.

APPLICATION FILED JULY 29, 1910.

Reissued Sept. 19, 1911. 13,292.

2 SHEETS—SHEET 1.

WITNESSES:
Elizabeth C. Coupe
Edith C. Hollbrook

INVENTOR.
Stephen Snow
By his Attorney,
Nelson W. Howard

S. SNOW.

LASTING MACHINE.

APPLICATION FILED JULY 29, 1910.

Reissued Sept. 19, 1911.

13,292.

2 SHEETS—SHEET 2.

WITNESSES.

Elizabeth C. Coupe

Edith C. Holbrook

INVENTOR.

Stephen Snow

By his Attorney,

Nelson W. Howard

UNITED STATES PATENT OFFICE.

STEPHEN SNOW, OF EVERETT, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

13,292. Specification of Reissued Letters Patent. Reissued Sept. 19, 1911.

Original No. 946,708, dated January 18, 1910, Serial No. 276,995. Application for reissue filed July 29, 1910. Serial No. 574,580.

*To all whom it may concern:*

Be it known that I, STEPHEN SNOW, a citizen of the United States, residing at Everett, in the county of Middlesex and State of Massachusetts, have invented new and useful Improvements in Lasting-Machines, of which the following is a specification.

This invention relates to means for holding shoe uppers upon lasts and particularly to means for clamping upper materials in position about an end portion of a last during the operation of lasting and holding them while the edge portions of the materials are being manipulated over the edge of the last.

The object of the invention is to secure more perfect fitting of the upper materials to the last than has heretofore been obtained, particularly in certain classes of work in which the upper materials include one or more layers of stiff material which it is difficult to bend or fold over the edge of the last, such as an unmolded counter.

The invention is herein shown as embodied in a lasting machine of the "bed" type, the particular machine herein illustrated as equipped with the invention being known commercially as the Ideal lasting machine which is more fully shown and described in United States Letters Patent, No. 521,954 of June 26, 1894, and No. 552,834 of January 7, 1896. In this machine the shoe is held between end-lasting mechanisms by which the upper materials at the two ends of the shoe are manipulated over the edge of a last into position to be secured to the innersole.

The invention is herein shown in combination with mechanism for manipulating the upper materials into lasted position, but it will be understood that my invention is not limited to use in a lasting machine.

The invention may be embodied in mechanism for holding a shoe for any purpose, as, for example, while it is being lasted either by hand or by a lasting mechanism which is independent of the shoe holding mechanism.

The invention is here shown in combination with mechanism for lasting the heel end of a shoe and it is of particular importance in holding the upper materials of this portion of the shoe, which includes, of course, the heel stiffener or counter, closely against the heel portion of the last, because it is found in practice that these upper materials tend to spring away from the side of the last adjacent to its edge when their edge portions are bent or folded over the edge of the last. This is especially noticeable when counters are used which have straight or unmolded flange portions instead of flange portions which have been molded to lie upon the last bottom.

As machines of the type illustrated have been heretofore constructed, end-embracing bands which are designed to clamp the upper materials about the end portions of lasts have been supported at their two ends and at their middle portions, which engage the extreme rear end of the last and in closing a band it has been firmly pressed against the sides of the last at these three points. With clamping or holding means thus constructed it has been found that during the operation of bending the edge portion of the upper materials over upon the last bottom, and particularly in breaking down the flange of an unmolded heel counter, the upper materials at the corners of the last frequently sprang away from the sides of the last near its edges, the term "corners" being used herein to designate those portions of each side of the last which are located approximately midway between the extreme rear end of the heel and the front ends of the heel stiffener or between the points engaged by those portions of the heel band at which the heel band is supported. This has caused imperfect fitting of the upper at these points which of course was objectionable.

In accordance with the present invention means is provided for holding the upper materials against the last at the corners of the last.

In the illustrated embodiment of the invention pressers are provided by which portions of the band at the sides of the last are caused to force and hold the upper materials against the corners of the last and said pressers are arranged to be actuated or controlled by connections of their own with the actuating mechanism by which the band is closed. To this extent the pressers are separately actuated rather than partaking merely of the movement of the heel band.

As is well known, some lasts are not symmetrically formed at the heel end, but are fuller or larger upon one side than upon the other side. Difficulty has been experienced in clamping the upper materials with the desired firmness against the smaller side of such lasts. To obviate this difficulty one object of the present invention is to provide means for permitting the presser bars to adapt themselves to the contour of the last on its two sides and for then pressing the bars uniformly toward the last so that the upper materials are held firmly against the opposite corners of the last notwithstanding differences in the fullness of the two sides of the last. To this end, in the illustrated embodiment of the invention, the pressers are actuated through an equalizing device which allows either presser first meeting resistance to pause in its movement while the other presser continues to advance until it has encountered an equal resistance on its side of the last, after which the pressers will act uniformly for pressing and holding the upper materials against the last at the two points of engagement.

Other features of the invention including details of construction and combinations of parts will be hereinafter described and pointed out in the claims.

Figure 1:
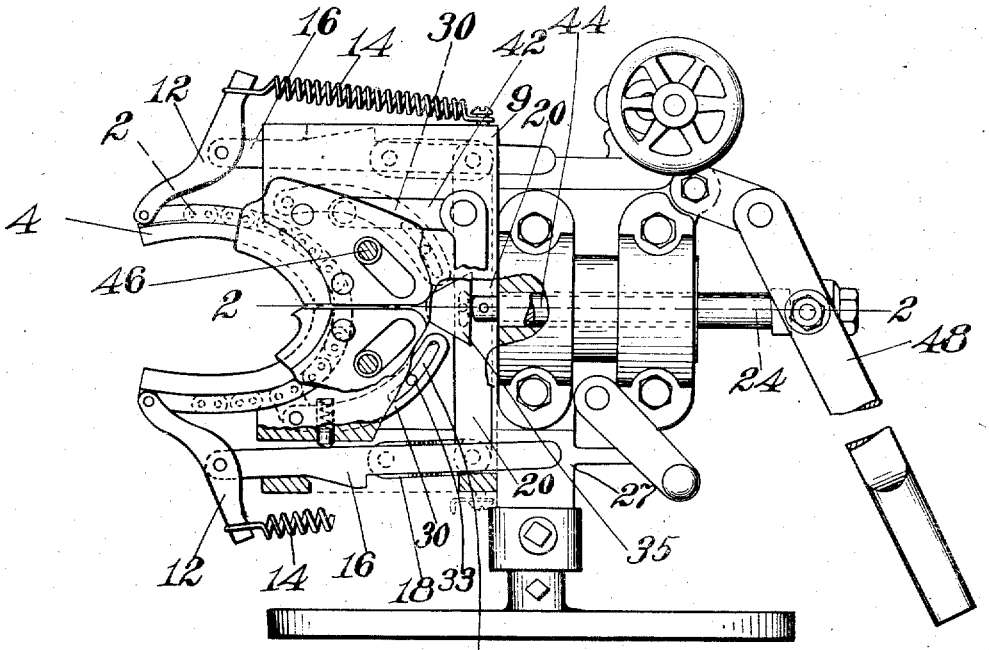
Figure 3:
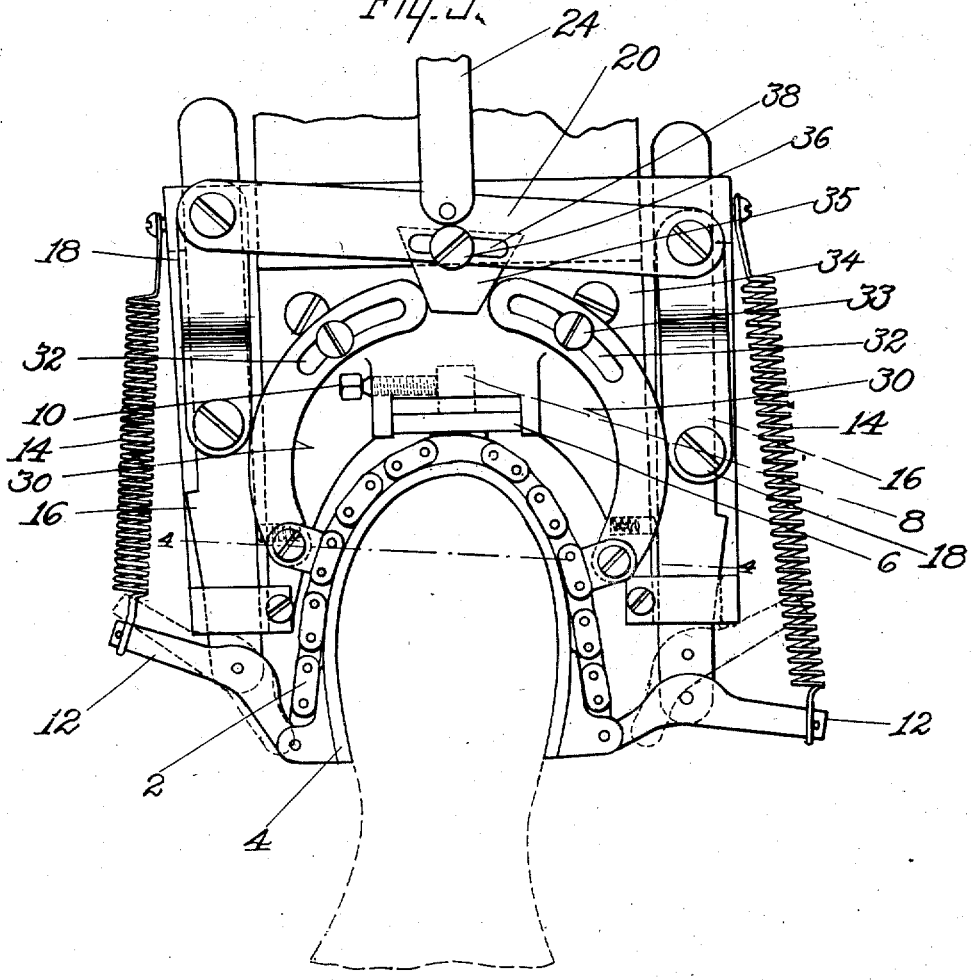
Figure 4:
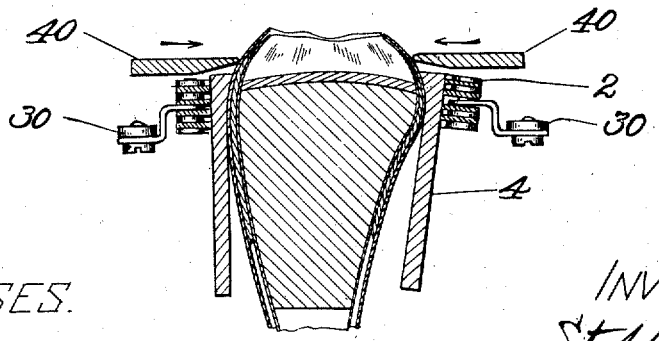

In the drawings which represent a preferred embodiment of the invention, Figure 1 is a plan view of so much of an end-lasting mechanism with my improvements applied to it as is necessary for disclosing the relation of the new parts to the associated portions of the heel clamping and lasting means; Fig. 2 is a sectional view on line 2—2 of Fig. 1; Fig. 3 is a bottom plan view of the heel clamping band and its actuating mechanism; Fig. 4 is a sectional view on line 4—4 of Fig. 3 showing a shoe in position within the heel band and representing the lasting plates as advancing to break down or fold the upper materials, including an unmolded heel counter, into position to be secured to the innersole on the bottom of the last.

The heel band for embracing the heel end of the last and clamping and holding the upper materials against the last while the edge portions of said materials are being folded or manipulated into lasted position upon the last bottom is shown as comprising a chain 2 and a leather lining 4 secured to the chain. The chain is provided at the middle rear portion of the band with a depending block 6 having a lateral stud 8 which is received in a recess in the band-support 9 and secured by a screw 10, as shown in Figs. 2 and 3. The front ends of the chain at the open end of the band are pivoted to levers 12, the outer ends of which are connected by springs 14 to the support 9. The levers are pivoted to slide-bars 16 which are guided in the support and are connected by links 18 to the opposite ends of a lever 20. The lever 20 is pivoted midway between its ends to a rod 24, as shown most clearly in Figs. 2 and 3. The rod is longitudinally movable through a guideway in the frame-work of the heel-lasting mechanism and is yieldingly connected with a lever 25 having its lower end in the path of a rocker arm 26 which may be moved manually or by power toward the dotted line position shown in Fig. 2. Movement of the rocker arm in the direction suggested turns the lever 25 to advance the rod 24, for causing the band to embrace the heel end of a shoe and clamp the upper materials against the last. It may be explained that in practice a shoe is supported at the proper altitude to be acted upon and as herein shown the entire end-lasting mechanism supported on the carriage 27 is advanced over the track 28 to position the middle rear portion of the band against the heel end of the last where it is locked by a pawl 29 engaging ratchet teeth on the track. The parts as thus far described may be substantially as shown in Letters Patent, No. 552,834, before mentioned, and it will be understood that by means of the described construction the band is firmly engaged with the extreme heel end of the last and that the actuation of the lever 25 advances the slide-bars 16 which tend to advance the levers 12. This causes the levers first to draw the end portions of the band forwardly until the band has snugly embraced the rear portion of the last, after which the levers rock from the angular position shown in dotted lines in Fig. 3 toward the position shown in full lines for carrying the end portions of the band inwardly against the shoe at about the front ends of the heel stiffener. By this arrangement the upper materials are held firmly against the extreme rear end of the last and against the sides of the last at the front ends of the band, but there is not sufficient pressure against the upper materials at the corners of the last to prevent said materials from sometimes springing away from the last to an objectionable extent while the flange of an unmolded heel stiffener is being broken down.

In accordance with this present invention pressers, herein represented as bars 30, are arranged to act against the shoe at the corners of the last for pressing and holding the upper materials against this portion of the last. As herein shown the bars 30 are connected with the chain 2 and act through the heel band for exerting pressure against the upper materials at the corners of the last. To this end the bars are curved as shown in Fig. 3 and are provided with curved slots 32 in which stand pins 33 rigidly secured to a cross-plate 34 attached to the band-support 9. The rear ends of the bars are engaged by the inclined faces of a wedge block 35 which is mounted on the lever 20, heretofore described This arrangement provides that when the lever 25, also before mentioned, is turned for closing the band about the end of the last, the wedge block will be advanced between the rear ends of the bars 30 thus actuating the pressers separately from or in addition to the movement which the band as a whole receives. The arrangement by which the front ends of the bars 30 are connected with the heel band and the walls of the curved slots engage the fixed studs 33 insures that the bars shall rock and advance in curved paths and press against the shoe at the corners of the last, whereby the upper materials are pressed inwardly and securely held against springing away from the corners of the last.

Preferably and as herein shown the wedge block 35 acts as an equalizer for insuring uniform pressure by the two bars 30, and to this end the block is shown as movably mounted upon the lever 20 being connected thereto by a pin 36 passing through a slot 38 in the lever as shown most clearly in Fig. 3. This construction permits either bar that may encounter greater resistance to its advance movement than the other bar to pause while the block moves sidewise upon the lever 20 until the advancing bar encounters an equal resistance, whereupon the two bars will act uniformly against the work. This provision enables the upper to be pressed and held with equal force against the opposite corners of a last which is fuller upon one side than upon the other side.

The means herein shown for breaking down and otherwise manipulating the edge portions of the upper materials into lasted position comprises lasting plates 40 connected by links 42 with the cross-head of a plunger 44 and guided by roller stud 46 to close toward each other as they are advanced by the plunger. A hand lever 48 is shown for actuating the plunger. The advancing and closing movement of the lasting plates causes them to bend or fold inwardly the edge portions of the upper materials, as indicated in Fig. 4, and to press them into lasted position upon the bottom of the last.

In the use of the machine herein shown as provided with my invention, a shoe is positioned upon a jack, not shown, and the heel-lasting mechanism is moved over the track 28 into operative relation to the heel end of the shoe, the middle portion of the band being pressed against the extreme rear end of the heel. The end-lasting mechanism is locked in this position by the pawl 29. The rocker arm 26 is then actuated either manually or by power to turn the lever 25 as described for moving the lever 20 forwardly. This movement of the lever advances the bars 16 for actuating the levers 12 and causes them to tend to draw the ends of the band forwardly and at the same time to press them inwardly, whereby the band is made to embrace the last snugly and to press the upper materials against the sides of the last. The movement of the lever 20 also acts through the wedge-block 35 to press and hold the band against the corners of the last and thereby prevent the upper materials from springing away from the last during the subsequent operation of the wiper-plates 40, by means of the hand lever 48, in breaking down the upper materials and wiping them over the last bottom. If the last is fuller on one side than on the other side, as is the last illustrated in Fig. 4, the wedge-block slides on the lever 20 to cause the presser bar 30 which is located at the side of the last having the less fullness to move farther than the other presser bar whereby the heel band is forced equally against the two corners of the last.

It is obvious that my invention is not limited to the embodiment thereof herein shown but the invention may be embodied in many mechanisms for supporting and holding upper materials about a last.

Having explained the nature of my invention and having fully described a construction embodying the same, I claim as new and desire to secure by Letters Patent of the United States:—

1. In a machine of the class described, the combination with means for clamping upper materials about the end portion of a last, of additional means for holding the upper materials against the corners of the last.

2. In a machine of the class described, the combination with an end-embracing band and mechanism for closing said band about the end of a last, of additional means for pressing said band against the corners of the last.

3. In a machine of the class described, the combination with an end-embracing band and mechanism for closing the band about an end of a last, of means for pressing the band against the opposite corners of the end of the last, and means for equalizing the pressure at the two corners.

4. In a machine of the class described, the combination with a heel band and actuating mechanism for causing the band to embrace the heel end of a last, of means intermediate said actuating means and the portions of the band adjacent to the corners of the last for forcing said portions of the band against the corners of the last.

5. In a machine of the class described, the combination with means comprising an end-embracing band for clamping upper materials about the end portion of a last, of presser bars engaging the portions of the band adjacent to the corners of the last, a wedge-block for actuating said presser bars, means for supporting said wedge-block, and a movable connection between the wedge-block and the supporting means arranged to cause the block to act equally upon the two presser bars.

6. In a lasting machine, the combination with end-embracing mechanism comprising an end-embracing band, and mechanism for manipulating the upper materials into lasted position upon the bottom of the last, of means for applying pressure through the band to the corners of the last to prevent the upper material from springing away from the sides of the last while being manipulated into lasted position on the bottom of the last.

7. In a lasting machine, the combination with an end-embracing band and means for closing the band about the heel end of a last, of lasting plates for bending the upper materials over the edge of the last, and means additional to the band closing means for forcing the band against the upper materials at the corners of the last to prevent the upper materials from springing away from the last while being bent over the edge of the last by the plates.

8. In a machine of the class described, the combination with an end-embracing band and actuating mechanism connected with the band at its two ends and at its middle portion, of means for engaging it at places intermediate said points of connection with said actuating mechanism for causing it to hold the upper materials against the corners of the last.

9. In a machine of the class described, the combination with means for clamping the upper materials about the end portion of a last, of additional means arranged for self adjustment to lasts of different shapes for applying pressure through the clamping means for holding the upper materials against the corners of the last.

10. In a machine of the class described, the combination with an end-embracing band, of automatically operating mechanism for closing the band about the end of a last, said mechanism having provision for pressing the band against the corners of the last for the purpose described.

11. In a machine of the class described, the combination with means comprising an end-embracing band for clamping upper materials about the end portion of a last, of presser bars engaging the band, a wedge-block for actuating said presser bars, means for supporting said wedge-block, and a movable connection between the wedge-block and the supporting means arranged to cause the block to act equally upon the two presser bars.

12. In a lasting mechanism the combination of an end embracing band, end-wise movable bars acting on the band at opposite sides of the machine, an actuator, and an equalizing slide movable transversely of the machine.

13. In a lasting mechanism the combination of an end embracing band, inwardly acting bars at opposite sides of the machine for acting upon the band, an actuator movable longitudinally, an equalizer movable transversely, and opposed cam inclines formed on one of said coöperating parts whereby unequal resistance to band movement at the two sides of the shoe effects transverse movement of the equalizer and differential actuation of the bars.

14. In a lasting mechanism an end embracing band, an actuator therefor, pressure transmitting devices connected with the band at opposite sides of the machine, and an equalizing wedge intermediate between the actuator and said devices operating to cause opposite sides of the band alternatively to be moved inwardly a greater distance.

15. In a lasting mechanism an end embracing band, an actuator therefor, end-wise sliding members operatively connected with the band at opposite sides of the shoe for applying pressure through the band, and an equalizer intermediate between said members and the actuator and freely movable transversely of the machine to position said members for applying the same pressure at the two sides of an unsymmetrical shoe.

16. In an end lasting mechanism an end embracing band, pressure transmitting devices at opposite sides of the machine for acting upon the band, and actuating means comprising a member having oppositely inclined faces cooperating with said devices and movable transversely of the machine to actuate said devices differentially.

17. In a lasting mechanism, an end embracing band, and a member arranged for forward actuation for applying pressure to the band, having oppositely inclined pressure applying faces and mounted to slide transversely of the machine to equalize the band pressure at the two sides of the machine.

18. In a lasting mechanism an end embracing band, slide bars movable forwardly and inwardly to apply pressure to the band, a plunger and a wedge block located between the rear ends of the bars and connected to the plunger to slide transversely of the shoe for adjusting the bars according to the shape of the portion of the last embraced by the band.

19. In a lasting mechanism an end embracing band, a plunger mounted for forward actuation, a cross bar on the plunger, forwardly and inwardly movable pressure transmitting bars connected with the band at opposite sides of the machine, a wedge block having oppositely inclined ends arranged to engage the rear ends of the last mentioned bars and having a pin and slot connection with the cross bar to permit independent movement of the wedge block transversely of the machine for adjusting the pressure transmitting bars to the shape of the last while compelling forward movement of the wedge block with the cross bar and plunger.

In testimony whereof I have signed my name to this specification in the presence of two subscribing witnesses.

STEPHEN SNOW.

Witnesses:

MARY S. WATKINS,
ARTHUR L. RUSSELL.